(12) United States Patent
Tae et al.

(10) Patent No.: US 12,056,210 B2
(45) Date of Patent: Aug. 6, 2024

(54) AI-BASED PRE-TRAINING MODEL DETERMINATION SYSTEM, AND AI-BASED VISION INSPECTION MANAGEMENT SYSTEM USING SAME FOR PRODUCT PRODUCTION LINES

(71) Applicant: LG ELECTRONICS INC., Seoul (KR)

(72) Inventors: Kyong Pil Tae, Seoul (KR); Young Wook Kim, Seoul (KR); Bong Su Cho, Seoul (KR); Chang Yong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 17/619,522

(22) PCT Filed: Aug. 19, 2019

(86) PCT No.: PCT/KR2019/010502
§ 371 (c)(1),
(2) Date: Dec. 15, 2021

(87) PCT Pub. No.: WO2021/033792
PCT Pub. Date: Feb. 25, 2021

(65) Prior Publication Data
US 2022/0245402 A1    Aug. 4, 2022

(51) Int. Cl.
*G06K 9/00* (2022.01)
*A61K 35/12* (2015.01)
(Continued)

(52) U.S. Cl.
CPC ........ *G06F 18/2148* (2023.01); *G06F 18/213* (2023.01); *G06T 7/001* (2013.01);
(Continued)

(58) Field of Classification Search
CPC .................................. G06K 9/00; A61K 35/12
(Continued)

(56) References Cited

U.S. PATENT DOCUMENTS 7,227,893 B1 * 6/2007 Srinivasa ......... G08B 13/19602
348/169
10,296,794 B2 * 5/2019 Ratti .................... G06V 10/764
(Continued)

OTHER PUBLICATIONS

Han et al., "A new image classification method using CNN transfer learning and web data augmentation", Expert Systems with Applications, vol. 95, Apr. 1, 2018, pp. 43-56, Abstract only.

*Primary Examiner* — Seyed H Azarian
(74) *Attorney, Agent, or Firm* — Birch, Stewart, Kolasch & Birch, LLP

(57) ABSTRACT

An AI-based pre-training model determination system is proposed. When determination type information is input, the AI-based pre-training model determination system extracts a candidate model among a plurality of learning models on the basis of determination type information, and the candidate model determines new training data. An uppermost candidate model whose determination accuracy is greater than or equal to a first reference value preset on the basis of the determination accuracy of the candidate model is determined as a pre-training model for generation of a new learning model, thereby improving the determination accuracy of the new learning model.

16 Claims, 10 Drawing Sheets

(51) Int. Cl.
*G06F 18/213* (2023.01)
*G06F 18/214* (2023.01)
*G06T 7/00* (2017.01)

(52) U.S. Cl.
CPC .............. *G06T 2207/20081* (2013.01); *G06T 2207/30108* (2013.01)

(58) Field of Classification Search
USPC ........ 382/100, 103, 106–107, 141–145, 154, 382/155, 168, 173, 181, 190, 194, 209, 382/219, 254, 276, 284–291, 312; 348/169, 170
See application file for complete search history.

(56) References Cited

U.S. PATENT DOCUMENTS

| | | |
|---|---|---|
| 2015/0254832 A1 | 9/2015 | Plihal |
| 2017/0083829 A1 | 3/2017 | Kang et al. |
| 2018/0164792 A1* | 6/2018 | Lin .................. G05B 19/41875 |
| 2018/0211117 A1* | 7/2018 | Ratti .................... G06V 10/764 |
| 2019/0130583 A1* | 5/2019 | Chen ....................... G06T 7/194 |
| 2019/0303717 A1* | 10/2019 | Bhaskar ................ G06F 18/214 |
| 2021/0364447 A1* | 11/2021 | Naruse ................. G06V 10/772 |

\* cited by examiner

[FIG. 1]
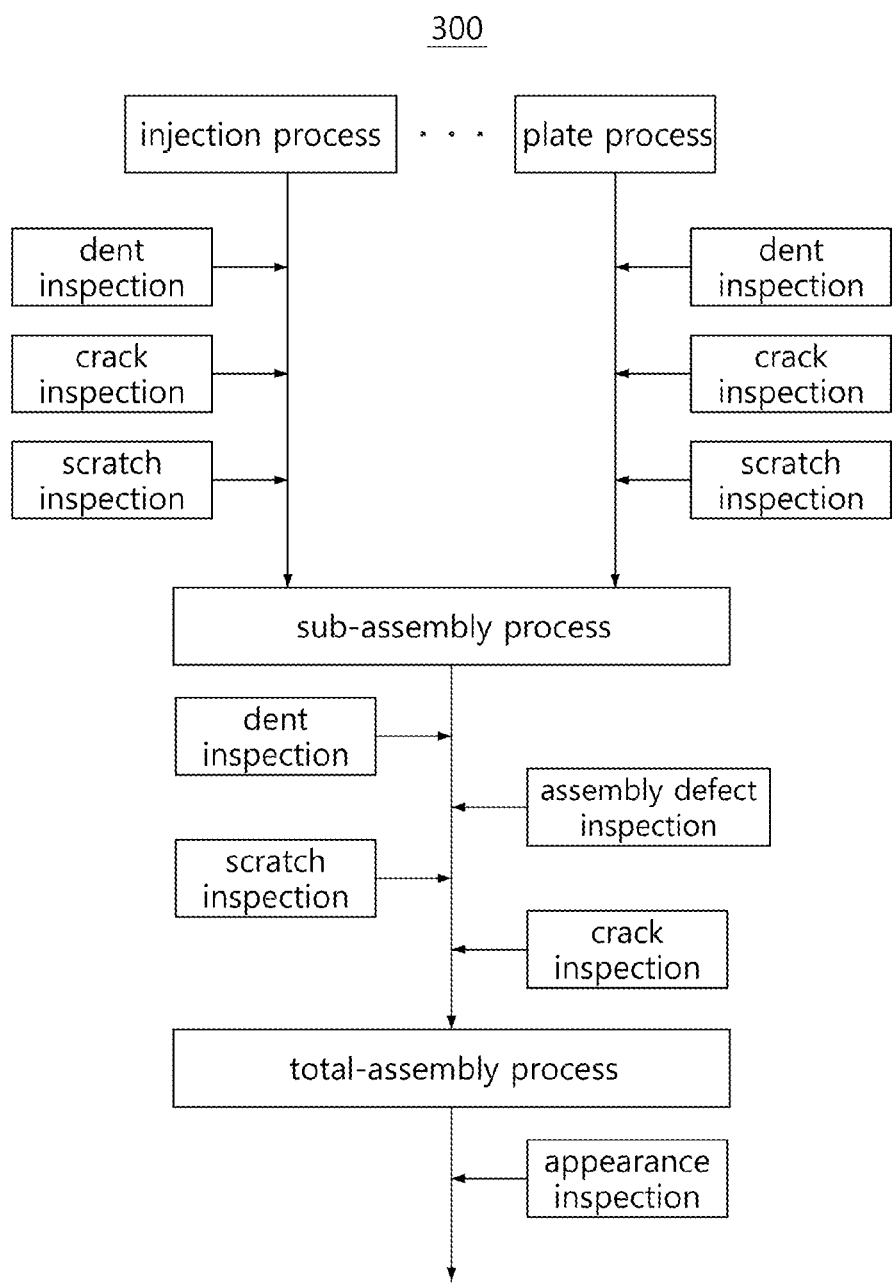

[FIG. 2]
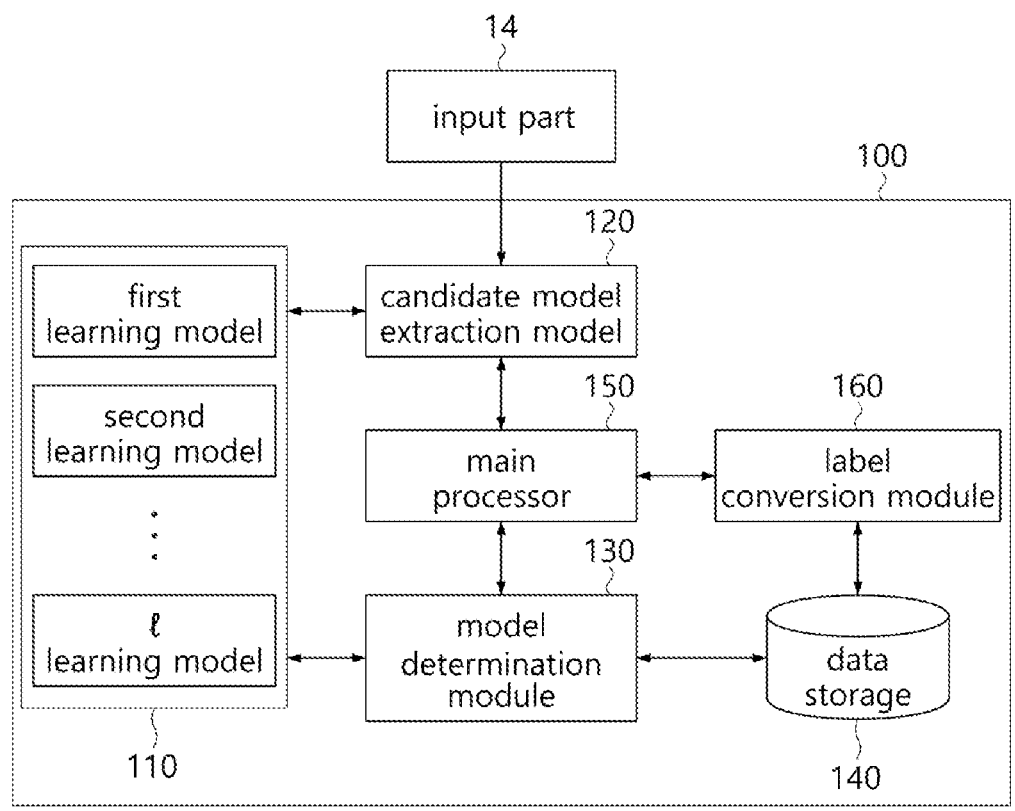

[FIG. 3]
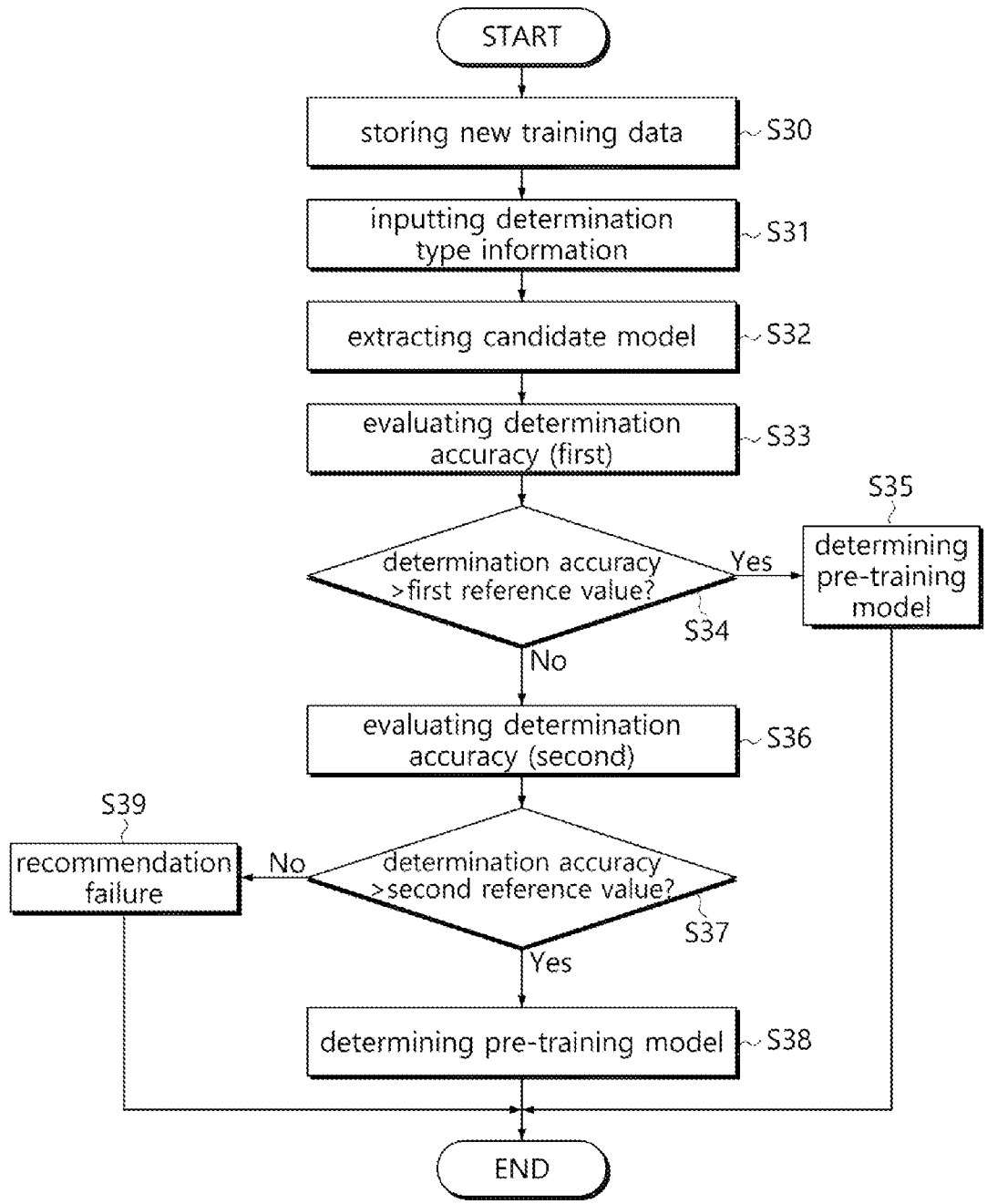

[FIG. 4]
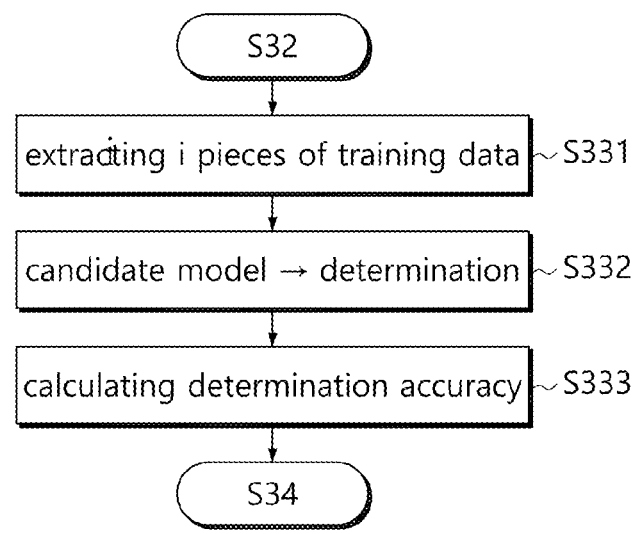

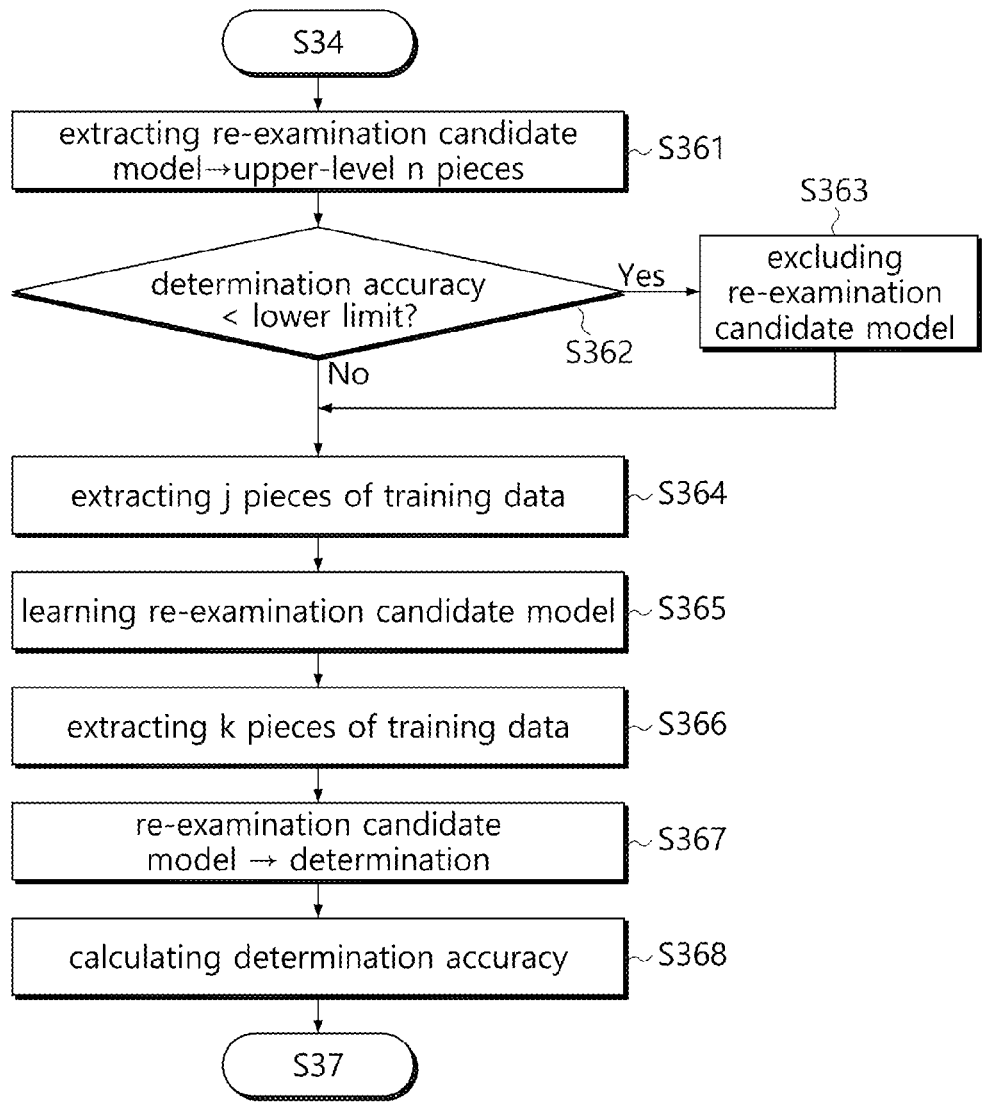
[FIG. 5]

[FIG. 6]
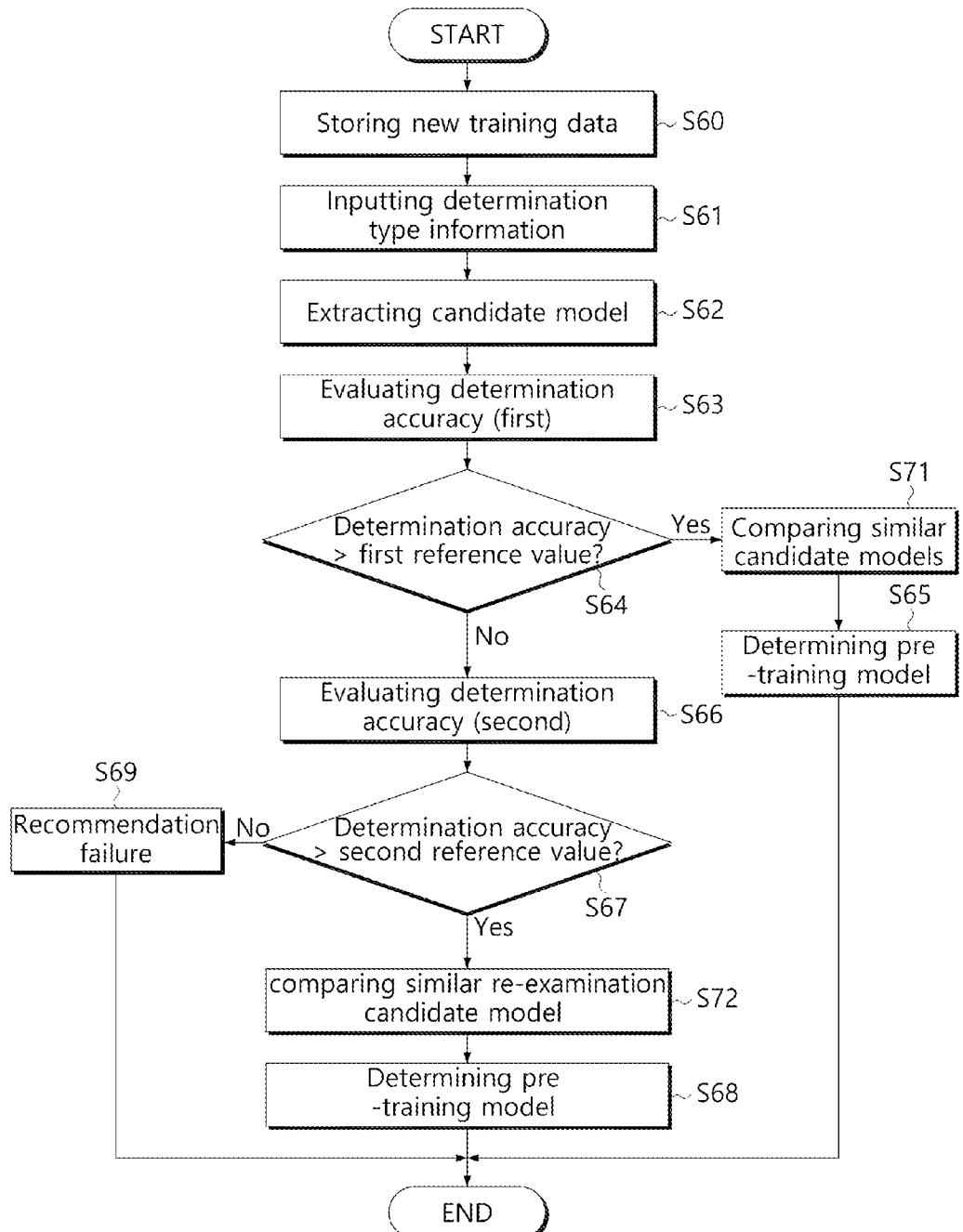

[FIG. 7]
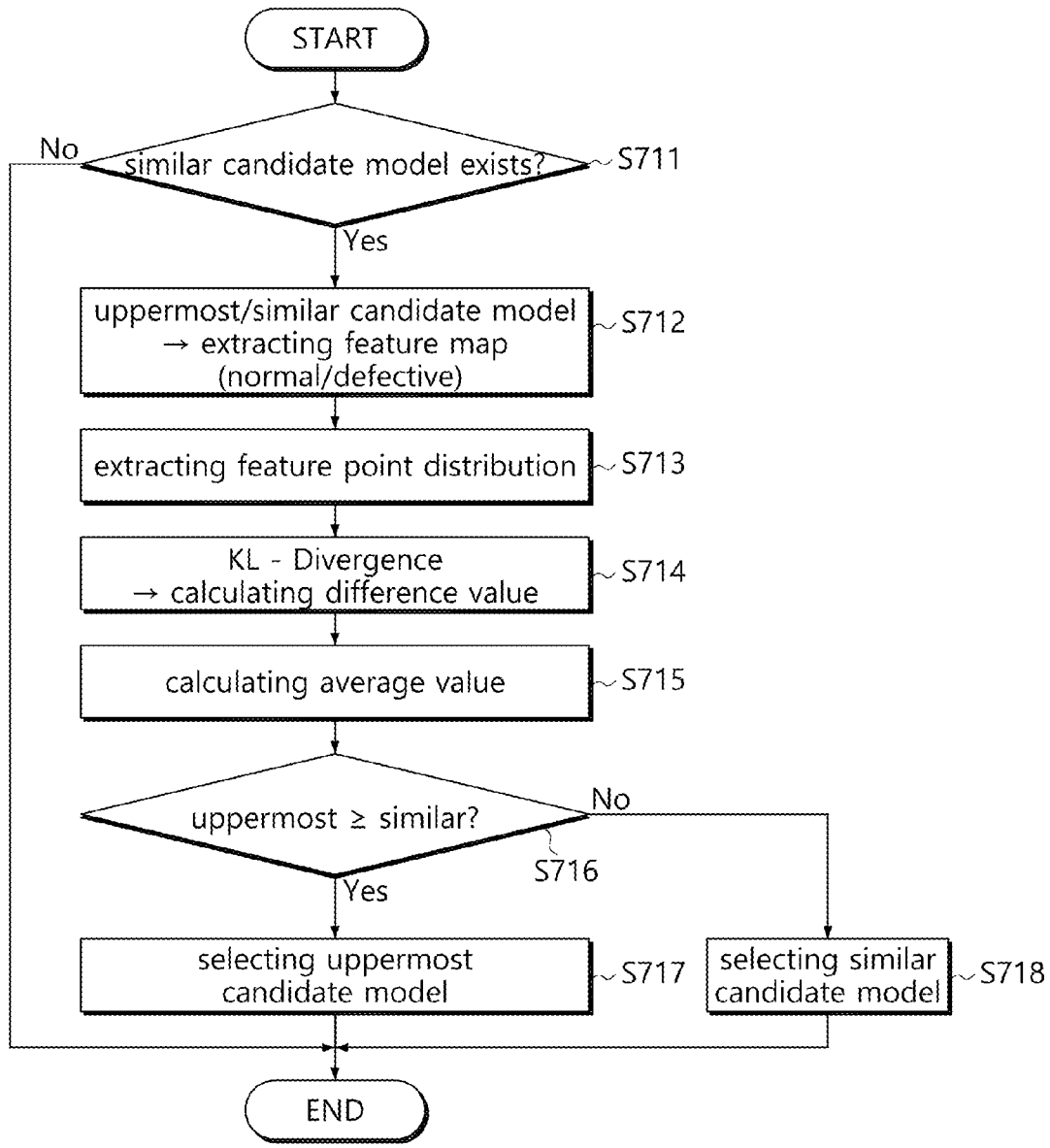

[FIG 8]
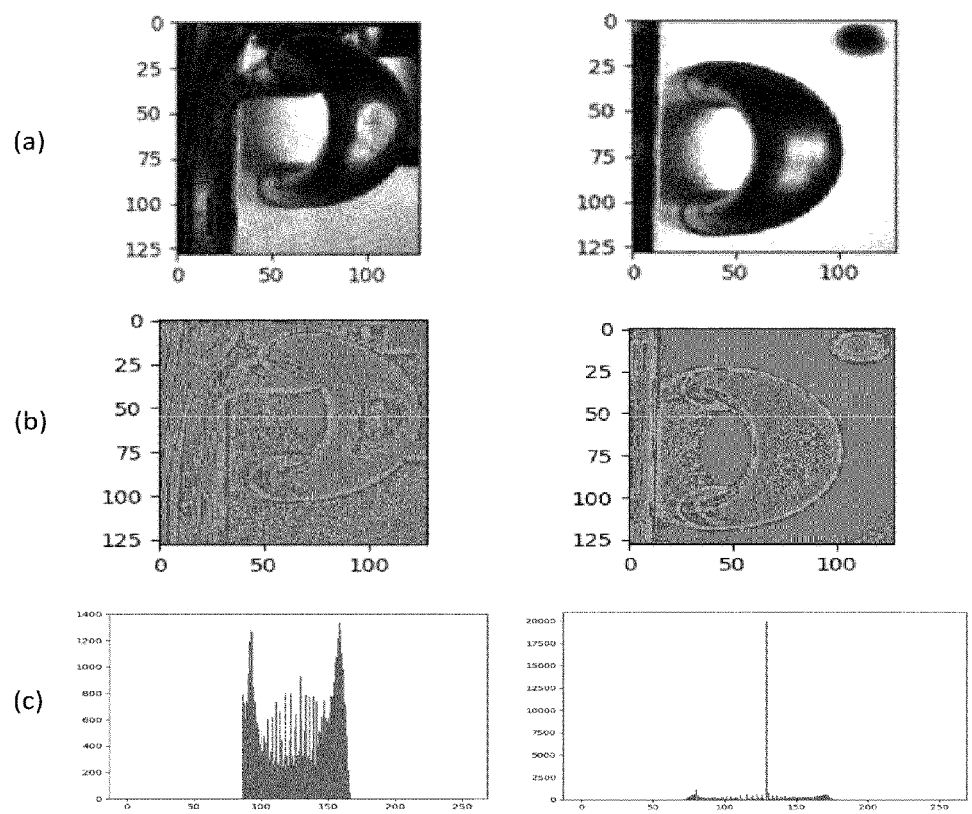

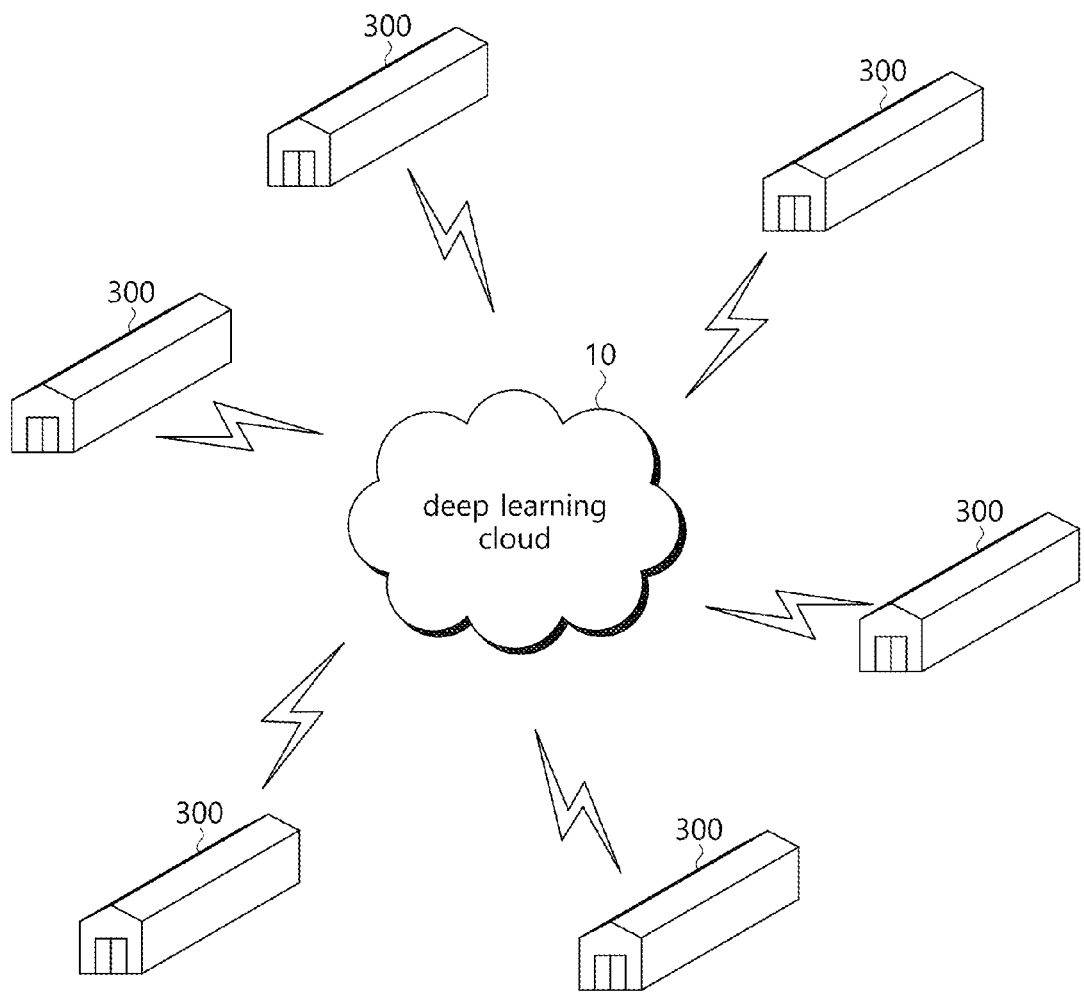
[FIG. 9]

[FIG. 10]
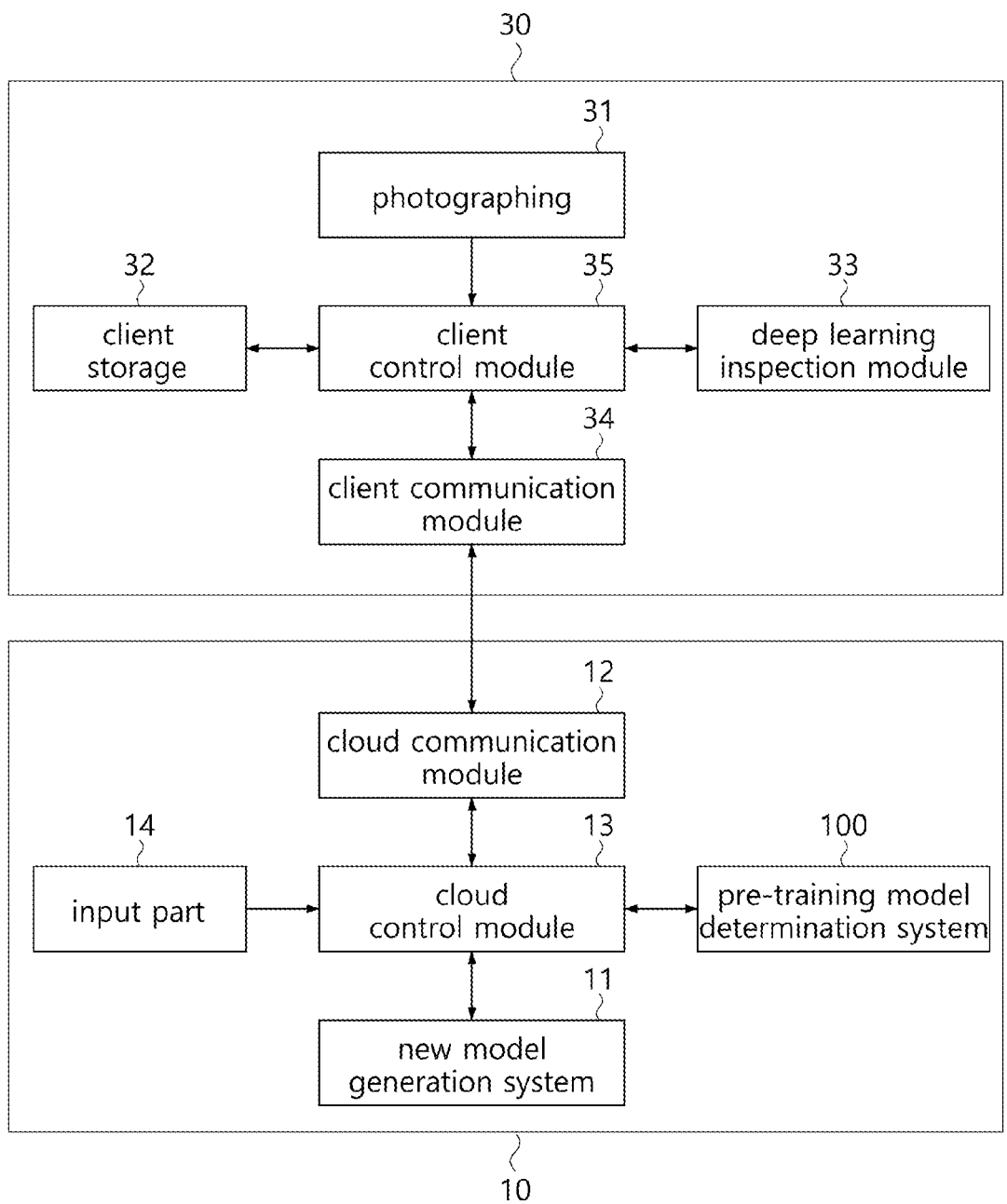

AI-BASED PRE-TRAINING MODEL DETERMINATION SYSTEM, AND AI-BASED VISION INSPECTION MANAGEMENT SYSTEM USING SAME FOR PRODUCT PRODUCTION LINES

CROSS REFERENCE TO RELATED APPLICATIONS

This application is the National Phase of PCT International Application No. PCT/KR2019/010502, filed on Aug. 19, 2019, all of which is hereby expressly incorporated by reference into the present application.

TECHNICAL FIELD

The present disclosure relates to an AI-based pre-training model determination system and an AI-based vision inspection management system using the same for a product production line and, more particularly, to an AI-based pre-training model determination system and an AI-based vision inspection management system using the same for a product production line, wherein a new learning model may be generated by using a previously registered learning model as a model for pre-training (hereinafter referred to as the pre-training model).

BACKGROUND ART

Deep learning technology, one of artificial intelligence (AI) technologies, refers to an artificial neural network-based machine learning method that allows machines to learn by simulating human biological neurons. Recently, deep learning technology has been receiving great attention as contributing to the development of image recognition, speech recognition, and natural language processing.

Such deep learning technology has recently been applied to vision inspection in product production lines. As an example, Korean Patent Application Publication No. 10-2019-0063839 disclosed a "METHOD AND SYSTEM FOR MACHINE VISION BASED QUALITY INSPECTION USING DEEP LEARNING IN MANUFACTURING PROCESS" (hereinafter referred to as "related art 1").

The above-described technology, which is disclosed in the Korean Patent Application Publication, generates product images for learning, trains a classifier for classifying normal and defective products with the generated product images for learning, and uses the trained classifier to determine a product as normal or defective.

As with the technology disclosed in the above-described Korean Patent Application Publication, in deep learning technology, image data of normal and defective products and label information that records whether the corresponding image is a defective product image or a normal product image are input to a learning model, such as the classifier, and then learned, so as to generate a new learning model for inspection of normal and defective product.

In general, various types of inspections of defective products are performed on product production lines. A product production line for manufacturing one product includes numerous processes such as injection process, plate process, sub-assembly process, and total-assembly process, and vision inspection is performed on a result of each process, for example, parts manufactured through injection or plate molding, sub-parts manufactured through a part-assembly process, and products manufactured through a total-assembly process.

FIG. 1 is a view schematically showing an example of a general product production line.

When described with reference to FIG. 1, a product production line may include an injection process, a plate process, a sub-assembly process, and a total-assembly process. An injection process and a plate process manufacture parts necessary for product production in the injection method or plate method, and one product production line may include a multiple injection processes or plate processes.

For parts manufactured through an injection process or a plate process, processes of dent inspection, crack inspection, and scratch inspection may be included for inspecting various type of defects, for example, dents, cracks, scratches, etc.

As shown in FIG. 1, the sub-assembly process is a process for producing sub-parts by assembling parts, and the sub-parts may also undergo dent inspection, crack inspection, and scratch inspection, and may also include inspection process of assembly defects such as missing parts or misalignment.

Total-assembly process is a process of manufacturing a product by assembling sub-parts, wherein an appearance inspection process for defects, such as foreign matter adhesion defects and assembly defects, is performed. In the total-assembly process, dent inspection, crack inspection, and scratch inspection may be performed.

A separate vision inspection should be conducted according to the type of defects such as assembly defects, foreign matter adhesion defects, etc.

Meanwhile, since a result is different depending on each process, a format of an image to be used as training data may be different, type of defects may be different depending on the result even with the same defect type, and the result itself revealing a defect may be different, and thus form of the image is different, whereby each learning model should be generated and applied theoretically according to the result of each process and the type of defects.

In addition, in a case of a manufacturer producing various product lines, a product production line for each product is different, and even when the same injection process exists, the result is also different for each product, so a separate learning model should be generated for each product. Similarly, when a product production line is changed to produce a new product, a new learning model appropriate for each process and defect types of the new product production line should be generated.

Here, determination accuracy of a new learning model may be determined by various factors, wherein the amount of training data, selection of hyper-parameters initially set for learning, selection of a learning model, and the like are important factors in determining the determination accuracy.

However, in the case of a new learning model to be applied to a new product production line, the amount of training data, especially the amount of defective data, is relatively small, and thus what to select as a pre-training model acts as an important factor in improving determination accuracy.

DISCLOSURE

Technical Problem

An objective of the present disclosure is to provide an AI-based pre-training model determination system and an AI-based vision inspection management system using the same for a product production line, wherein an optimal pre-training model may be used in generating a new learning model by using a previously registered learning model as a pre-training model.

Another objective of the present disclosure is to increase determination accuracy of a new learning model by determining an optimal pre-training model in generating the new learning model by using a previously registered learning model as the pre-training model.

Yet another objective of the present disclosure is to recommend an optimal pre-training model while reducing the time required for determining the pre-training model and increasing the efficiency of a determination process.

Still another objective of the present disclosure is to construct an AI-based vision inspection system that may generate and apply a new learning model faster than before when setting up a new product production line.

Technical Solution

In an AI-based pre-training model determination system according to the present invention, a candidate model extraction module may extract at least two or more candidate models from among a plurality of learning models stored in a learning-model storage on the basis of determination type information when the determination type information for generating the new learning model is input, and a model determination module may input a preset number of training data from among the training data stored in the data storage into the extracted candidate models to determine whether defective or normal, and determine, as a pre-training model for generating the new learning model, an uppermost candidate model in which determination accuracy is greater than or equal to a first reference value.

The model determination module may extract feature point distribution of feature maps generated for the training data in a determination process of the uppermost candidate model and a similar candidate model when there is the similar candidate model whose determination accuracy difference from the uppermost candidate model is within a similarity range, and determines, as the pre-training model, any one candidate model whose difference in the feature point distribution between defective training data and normal training data is large.

The model determination module may calculate an average value of the differences in the feature point distribution between a preset number of normal training data and the defective training data, which are arbitrarily selected and determine any one candidate model, as the pre-training model, having a large average value among the uppermost candidate model and the similar candidate model.

The model determination module may extract upper-level n pieces of candidate models as re-examination candidate models on the basis of the determination accuracy when the determination accuracy is less than or equal to the first reference value, train the re-examination candidate models with the preset number of training data, input the preset number of training data into the trained re-examination candidate models to determine whether defective or normal, and determine, as the pre-training model, an uppermost re-examination candidate model in which the determination accuracy is greater than or equal to a preset second reference value.

When extracting the re-examination candidate models, the model determination module may remove candidate models, whose determination accuracy is less than or equal to a preset lower limit, from the re-examination candidate models.

The model determination module may extract feature point distribution of feature maps generated for each of the training data in a determination process of the uppermost re-examination candidate model and a similar re-examination candidate model when there is the similar re-examination candidate model, among the plurality of re-examination candidate models, whose determination accuracy difference from the uppermost re-examination candidate model is within a preset similarity range, and determine, as the pre-training model, any one candidate model, whose feature point distribution difference between defective training data and normal training data is large.

The difference in the feature point may be calculated through a KL-Divergence algorithm.

The determination type information may include at least one of defect type information on a type of defects, product type information on a type of products to be inspected, and part type information on a type of parts to be inspected, the learning models may include model information having at least one of the defect type information, the product type information, and the part type information, and the candidate model extraction module may extract the candidate model with reference to the model information.

The candidate model extraction module may extract a preset number of learning models as the candidate models according to a priority set in an order of the defect type information, the part type information, and the product type information.

The training data may include a training image and label information in which information on defect or normal for the training image is recorded, and may further include a label conversion module configured to convert the label information of the training data into a pre-registered format, and the model determination module may determine the pre-training model by using the training data in which the label information is converted by the label conversion module.

An AI-based vision inspection management system according to the present disclosure may include: a plurality of vision AI clients respectively installed on a plurality of geographically separated product production lines, and configured to use an AI-based learning model to inspect defects; and a vision AI cloud configured to generate a new learning model to be registered in each vision AI client.

The vision AI cloud may include: a pre-training model determination system; and a new model generation system configured to use a plurality of training data, train a pre-training model determined by a model determination module, and generate the new learning model.

The vision AI cloud may include a cloud control module configured to register the new learning model to at least one of the plurality of vision AI clients.

The plurality of training data may be stored after being transmitted from at least one of the plurality of vision AI clients, the pre-training model determination system may determine the pre-training model according to a model generation request from the vision AI cloud that has transmitted the training data, and the cloud control module may register the new learning model in the vision AI cloud.

Advantageous Effects

The AI-based pre-training model determination system and the AI-based vision inspection management system using the same for a product production line according to the present disclosure have one or more of the following effects.

First, the present disclosure provides an effect of increasing determination accuracy of a new learning model by determining an optimal pre-training model in generating the new learning model by using a previously registered learning model as the pre-training model.

Second, the present disclosure provides an effect that a candidate model for determining a pre-training model is extracted by using determination type information including any one of defect type information, product type information, and part type information, whereby a learning model similar to a new learning model may be extracted as the candidate model.

Third, the present disclosure provides an effect that a candidate model determines only a part of new training data, and a pre-training model is determined on the basis of determination accuracy, thereby recommending an optimal pre-training model and reducing the time required for determining the pre-training model.

Fourth, the present disclosure provides an effect that when determination accuracy of all candidate models is less than or equal to a first reference value, the upper-level n pieces of candidate models are extracted as re-examination candidate models, the re-examination model is trained with a part of training data, and then a pre-training model is determined, thereby recommending an optimal pre-training model while increasing the efficiency of a determination process of the pre-training model.

Fifth, the present disclosure provides an effect that when determination accuracy is within a similarity range, an additional evaluation process is performed by using feature point distribution, thereby recommending an optimal pre-training model.

Sixth, the present disclosure provides an effect that when applying a pre-training model determination system to an AI-based vision inspection management system, training data may be collected from numerous vision AI clients, whereby a new learning model is applicable faster than before when setting up a new product production line.

DESCRIPTION OF DRAWINGS

FIG. 1 is a view schematically showing an example of a general product production line.

FIG. 2 is a view showing a configuration of an AI-pre-training model determination system according to an exemplary embodiment of the present disclosure.

FIGS. 3 to 5 are views showing the exemplary embodiment of a determination process of a pre-training model by a pre-training model determination system according to the exemplary embodiment of the present disclosure.

FIGS. 6 and 7 are views showing another exemplary embodiment of a determination process of a pre-training model by a pre-training model determination system according to the exemplary embodiment of the present disclosure.

FIG. 8 is a view showing an example of a feature map and feature point distribution generated in the process of determining or learning a learning model in the pre-training model determination system according to the exemplary embodiment of the present disclosure.

FIGS. 9 and 10 are views showing a configuration of an AI-based vision inspection management system according to the exemplary embodiment of the present disclosure.

BEST MODE

According to the present disclosure, an AI-based pre-training model determination system is characterized in that the AI-based pre-training model determination system includes: a learning-model storage configured to store a plurality of learning models for vision inspection on a product production line; a data storage configured to store a plurality of training data collected for generation of a new learning model; a candidate model extraction module configured to extract at least two or more candidate models from among the plurality of learning models on the basis of determination type information when the determination type information for generating the new learning model is input, and a model determination module configured to input a preset number of training data from among the training data stored in the data storage into each of the candidate models to determine whether defective or normal, and determine, as a pre-training model for generating the new learning model, an uppermost candidate model in which determination accuracy of a plurality of candidate models is greater than or equal to a preset first reference value.

Mode of Invention

Advantages and features of the present disclosure and the methods of achieving the same will become apparent with reference to an exemplary embodiment described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

Hereinafter, an exemplary embodiment of the present disclosure will be described in detail with reference to the accompanying drawings.

FIG. 2 is a view showing a configuration of an AI-based pre-training model determination system 100 according to the exemplary embodiment of the present disclosure. Referring to FIG. 2, the AI-based pre-training model determination system 100 according to the present disclosure may include: a learning-model storage 110, a data storage 140, a candidate model extraction module 120, and a model determination module 130, and a main processor 150 that controls the same. Here, for operation of each component of the pre-training model determination system 100 according to the present disclosure, the main processor 150 includes hardware components such as a CPU and a RAM and software components such as an operating system.

The learning-model storage 110 stores a plurality of learning models for vision inspection on a product production line 300 (refer to FIG. 1). Referring to FIG. 1, as described above, the product production line 300 includes a process of various vision inspection such as dent inspection, a crack inspection, and a scratch inspection, which are for inspecting defects of parts or products that are results of each process. The learning-model storage 110 stores learning models applied to the process of vision inspection of the product production line 300, that is, a learning model for dent inspection, a learning model for crack inspection, a learning model for scratch inspection, and the like. In the present disclosure, it is assumed that a learning model is a deep learning-based learning model.

The data storage 140 stores a plurality of training data collected for generation of a new learning model. Here, the plurality of training data includes: a training image, that is, an image of a part or product, which is a result of a specific process of a new product production line 300; and label information in which defective product information or normal product information for each training image is recorded.

When determination type information for generating a new learning model is input through an input part 14, the candidate model extraction module 120 extracts at least two or more learning models as candidate models from among the plurality of learning models stored in the learning-model storage 110 on the basis of the determination type information.

Among the training data stored in the data storage 140, the model determination module 130 determines whether a product is normal or defective by inputting a preset number of training data into each candidate model. In addition, the model determination module 130 calculates determination accuracy of each candidate model from a determination result of the plurality of candidate models, and determines an uppermost candidate model, whose determination accuracy is greater than or equal to the preset first reference value, as a pre-training model for generation of a new learning model.

More specifically, a plurality of training data is collected in order to generate a new learning model. As an example, in the training data to be applied to generation of a new learning model to be applied to dent inspection after an injection process applied to a manufacturing process of a specific product, the images of normal parts and the images of corresponding parts in which distortion has occurred are respectively collected as training images, and in each of the training images, label information labeled as NG or OK is recorded and stored as training data.

In this case, for example, when defect type information for the type of defects is input as determination type information, the candidate model extraction module 120 searches the learning model, generated in order to examine the same defect type as in the defect type information, among the learning models stored in the learning-model storage 110 and extracts the learning model as a candidate model.

The present disclosure provides an example in which determination type information includes at least one piece of information including: defect type information for the above-described type of defects, product type information about the type of products to be inspected, and part type information about the type of parts to be inspected.

The defect type information indicates the type of defects, for example, dent, crack, scratch, misalignment, missing part, foreign material, and the like. The product type information indicates the type of products to be inspected, that is, for example, the type of target products such as a smartphone, a refrigerator, a TV, and the like. The part type information indicates the type of parts to be inspected, for example, a case, a frame, a PCB, a door, and the like.

Here, the learning model stored in the learning-model storage may include model information having at least one of defect type information, product type information, and part type information corresponding to the determination type information, and the candidate model extraction module 120 may extract a learning model corresponding to the determination type information input through the input part 14 as a candidate model with reference to the model information.

In this case, the model extraction module 120 may extract a preset number of candidate models according to a priority set in the order of defect type information, part type information, and product type information. For example, in a case of the input determination type information including: dent as the defect type information; a smartphone as the product type information; and a cover case as the part type information, the model extraction module 120 primarily extracts a learning model corresponding to the dent, and when the number of extracted learning models is greater than or equal to a preset number, secondarily extracts a learning model corresponding to the smartphone from among the extracted learning models.

Through the same process as above, the learning model that has tested the most similar type of defects to the new learning model may be extracted as the candidate model among the plurality of learning models stored in the learning-model storage 110, so a possibility of increasing the determination accuracy of the new learning model generated by using a pre-training model finally selected in a subsequent process may be improved.

Meanwhile, as described above, the model determination module 130 extracts a preset number of training data from among the training data stored in the data storage 140. For example, in a case of assuming that 1,000 pieces of training images are stored as training data, when all of the 1,000 pieces of training data are used to calculate determination accuracy, it takes a great deal of time to determine a pre-training model. Accordingly, by extracting 200 training images, that is, for example, 20% of the preset number, and using the images to calculate determination accuracy, it is possible to reduce the time required to determine the pre-training model.

Here, the model determination module 130 inputs the 200 pieces of training data to each candidate model so as to determine whether normal or not, and calculates the determination accuracy on the basis of label information of each training data. In addition, the model determination module 130 determines an uppermost candidate model, as a pre-training model for generating a new learning model, among each of the candidate models having determination accuracy greater than or equal to the first reference value. In the present disclosure, the first reference value is set to 80% as an example, but it is apparent that the technical spirit of the present disclosure is not limited thereto.

Through the same process as above, the learning model most similar to the new learning model among the learning models applied to the various product production lines 300 may be extracted as a candidate model, and the extracted candidate model is allowed to determine whether the training data is normal or not so that the uppermost candidate model among candidate models whose determination accuracy is greater than or equal to the first reference value is recommended as a pre-training model, thereby providing an effect of increasing the determination accuracy of the new learning model to be generated later.

In addition, the pre-training model is determined by using only a preset number of training data without using the entire collected training data, thereby significantly reducing the time required.

Hereinafter, an exemplary embodiment of a process of determining a pre-training model by the pre-training model determining system 100 according to the exemplary embodiment of the present disclosure will be described in detail with reference to FIGS. 3 to 5.

First, in step S30, when new training data for generating a new learning model is collected, the new training data is stored in the data storage 140. Here, a plurality of learning models is stored in the learning-model storage 110, and as described above, each learning model includes model information.

Then, in step S31, when determination type information for generating the new learning model is input, in step S32, on the basis of the determination type information, the candidate model extraction module 120 extracts a candidate model with reference to the model information of the learning model stored in the learning-model storage 110. A candidate model extraction method performed by the candidate model extraction module 120 is as described above.

In step S33, when the candidate model is extracted, the model determination module 130 performs a determination accuracy evaluation process for each candidate model. FIG. 4 is a view showing the determination accuracy evaluation process performed by the model determination module 130.

In step S331, the model determination module 130 extracts a preset number i of training data from among the training data stored in the data storage 140. Then, in step S332, the candidate determination module 130 allows each candidate model to determine whether each of the extracted i pieces of training data is normal or not, and in step S333, the candidate determination module 130 calculates determination accuracy of each candidate model on the basis of the determination result and label information of each training data.

When described with reference to FIG. 3, in step S34, it is determined whether the determination accuracy of each candidate model is greater than or equal to the first reference value, and in step S35, the uppermost candidate model among the candidate models whose determination accuracy is greater than or equal to the first reference value is determined as a pre-training model.

Meanwhile, in step S36, the model determination module 130 performs a secondary determination accuracy evaluation process when the determination accuracy of all candidate models is less than or equal to the first reference value in step S34. FIG. 5 is a view showing a secondary determination accuracy evaluation process performed by the model determination module 130.

When described with reference to FIG. 5, in step S361, the model determination module 130 extracts the upper-level n pieces of candidate models as re-examination candidate models on the basis of the determination accuracy calculated in step S33. For example, in a state where 10 candidate models are extracted, when all 10 candidate models show determination accuracy of 80% or less, the upper-level 5 candidate models are extracted as re-examination candidate models.

Here, in step S362, when extracting the upper-level n pieces of re-examination candidate modules, it is determined whether a candidate model whose determination accuracy of the n re-examination candidate models is less than or equal to a preset lower limit exists, and in step S363, a candidate model having determination accuracy less than or equal to the lower limit is excluded from the re-examination candidate model. For example, assuming that the lower limit is set to 60%, when the determination accuracy of two of the five re-examination candidate models is 60% or less, only three candidate models may be extracted as the re-examination candidate models.

In this way, the candidate models whose determination accuracy is smaller than the lower limit are excluded from the secondary determination accuracy evaluation process so that the time required for the secondary determination accuracy evaluation process is reduced, and a candidate model that is less likely to be determined as a pre-training model is excluded in advance, thereby increasing the efficiency of the model determination process.

In step S364, when the re-examination candidate model is extracted through the above process, the model determination module 130 extracts a preset number j of training data from the data storage 140. Then, in step S365, the model determination module 130 trains each re-examination candidate model with the extracted j pieces of training data.

In step S366, when the learning of the re-examination candidate model is completed, the model determination module 130 extracts a preset number (k) of training data from the data storage 140, in step S367, each re-examination candidate model that has completed learning is allowed to determine whether the extracted k pieces of training data is normal or not, and in step S368, the determination accuracy of each re-examination candidate model is calculated on the basis of the determination result and the label information of each training data.

Through the above process, in step S33 of evaluating the first determination accuracy, the candidate models having the determination accuracy less than or equal to the first reference value are trained by using a part of the training data for the generation of the actual new learning model, and then the determination accuracy is re-evaluated, thereby improving the possibility that a learning model suitable for new training data is extracted as a pre-training model.

When described with reference to FIG. 3, in step S37, when determination accuracy of a re-examination candidate model is calculated through the secondary determination accuracy evaluation process, it is determined whether the determination accuracy of each re-examination candidate model is greater than or equal to a second reference value, and in step S38, the uppermost re-examination candidate model among re-examination candidate models whose determination accuracy is greater than or equal to the second reference value is determined as the pre-training model. Whereas, in step S39, when there is no re-examination candidate model having the determination accuracy greater than or equal to the second reference value, it may be determined than recommendation has failed.

Here, the second reference value may be set relatively higher than the first reference value. For example, as described above, when the first reference value is set to 80%, the second reference value may be set to 90%. This example reflects that the re-examination candidate model to which the second reference value is applied may be trained with the training data to be applied when the actual new learning model is generated so that the determination accuracy of the new training data may be increased.

Through the same process as above, a secondary determination process is added, wherein the pre-training model is primarily determined from the candidate model having high determination accuracy, the upper-level n pieces of candidate models are trained by using new training data when the determination accuracy is lower than the first reference value, and then the determination accuracy is calculated so that the learning model closest to the new learning model may be determined as the pre-training model.

Hereinafter, another exemplary embodiment of the process for determining a pre-training model by the pre-training model determining system 100 according to the exemplary embodiment of the present disclosure will be described in detail with reference to FIGS. 6 and 7. The exemplary embodiment shown in FIGS. 6 and 7 is a modified example of the exemplary embodiment shown in FIGS. 3 to 5, and a description thereof may be omitted for the components that correspond to each other.

As in the above-described exemplary embodiment, in step S60, when new training data for generating a new learning model is collected, the new training data is stored in the data storage 140. Here, a plurality of learning models is stored in the learning-model storage 110, and each learning model includes model information.

In step S61, when determination type information for generating the new learning model is input, in step S62, the candidate model extraction module 120 refers to the model information of the learning model stored in the learning-model storage 110 and extracts a candidate model on the basis of the determination type information. A candidate model extraction method performed by the candidate model extraction module 120 is as described above.

In step S63, when the candidate model is extracted, the model determination module 130 performs a determination accuracy evaluation process for each candidate model. Here, since the determination accuracy evaluation process by the model determination module 130 corresponds to the exemplary embodiment shown in FIG. 4, a description thereof will be omitted.

In step S64, when the determination accuracy for each candidate model is calculated through the determination accuracy evaluation process, it is determined whether the determination accuracy of each candidate model is greater than or equal to a first reference value. In this case, in step S71, when there is a similar candidate model whose determination accuracy difference from the uppermost candidate model having determination accuracy equal to or greater than the first reference value is within a preset similarity range, a comparison process of the similar candidate model is performed.

When described in more detail with reference to FIG. 7, in step S711, when there is the similar candidate model whose determination accuracy difference from that of the uppermost candidate model is within the similarity range, in step S712, feature maps of the uppermost candidate model and similar candidate model are extracted. In addition, in step S713, the feature point distribution of the feature maps is extracted.

In order to calculate the determination accuracy of the uppermost candidate model and similar candidate model, the feature maps are generated for each training data in a process in which the corresponding candidate model determines training data on the basis of AI. In addition, the feature point distribution that is probability distribution may be extracted from the feature maps. Here, the feature map and feature point distribution are extracted for normal training data and defective training data among the training data.

FIG. 8 is a view showing an example of a feature map and feature point distribution generated in the process of determining or learning a learning model in the pre-training model determination system according to the exemplary embodiment of the present disclosure. In FIG. 8, the image on the left of (a) is defective training data, and the image on the right of (a) is normal training data. The image on the left of (b) is a feature map for the defective training data, and the image on the right of (b) is a feature map for the normal training data. The image on the left of (c) is feature point distribution of the feature maps for the defective training data, and the image on the right of (c) is the feature point distribution of the feature maps for the normal training data.

As shown in (c) of FIG. 8, the feature point distribution between the defective training data and the normal training data shows a difference, and increase in the difference between each feature point distribution may be evaluated as a fact that the learning model extracts the feature maps distinguishably well from an original image so that the determination accuracy of the final learning model may be increased accordingly.

When a similarity range for determination accuracy is set to 2%, the determination accuracy of the uppermost candidate model is calculated to be 85%, and when determination accuracy of the candidate model of the next rank is calculated as 83%, the corresponding candidate model is extracted as a similar candidate model, so the determination accuracy may vary depending on a sampling process of the extracted training data for calculating the determination accuracy and the number of the training data. Accordingly, since there is a case in which it is not possible to determine which learning model is optimal among the uppermost candidate model and the similar candidate model within the similarity range, an optimal pre-training model is determined by using the feature point distribution.

In the present disclosure, in step S714, among the uppermost learning model and the similar candidate model, the difference between the feature point distribution of the defective training data and the feature point distribution of the normal training data is calculated, and then, as an example, any one candidate having a large difference is determined as the pre-training model. In this case, in step S714, an arbitrarily preset number of defective training data and normal training data is extracted from among a plurality of training data applied to the determination process of the uppermost candidate model and the similar candidate model, and each difference value of feature point distribution between the defective training data and the normal learning data is calculated, and then, in step S715, an average value is calculated. In addition, in step S716, the average value of the uppermost candidate model is compared with the average value of the similar candidate model, in step S718, when the average value of the uppermost candidate model is large, the uppermost candidate model is selected, and in step S65, the uppermost candidate model is determined as a pre-training model accordingly.

Here, an algorithm capable of calculating a difference in probability distribution may be applied to a calculation of a difference value of feature point distribution, and in the present disclosure, it is exemplified that the difference value is calculated through the KL-Divergence algorithm.

When described with reference to FIG. 6, in step S66, when the determination accuracy of all candidate models is less than or equal to the first reference value in step S64, the model determination module 130 performs a secondary determination accuracy evaluation process. Here, since the secondary determination accuracy evaluation process corresponds to the exemplary embodiment shown in FIG. 5, a detailed description thereof will be omitted.

In S67, when the determination accuracy of each re-examination candidate model is calculated through the secondary determination accuracy evaluation process, whether the determination accuracy of each re-examination candidate model is greater than or equal to the second reference value is determined. In this case, in step S72, when there is a similar re-examination candidate model whose determination accuracy difference from the uppermost re-examination candidate model having determination accuracy greater than or equal to the second reference value is within a preset similarity range, a comparison process of the similar re-examination candidate model is performed.

Here, the comparison process of the similar re-examination candidate model corresponds to the comparison process of the similar candidate model shown in FIG. 7. More specifically, when there is a similar re-examination candidate model whose determination accuracy difference from the uppermost re-examination candidate model having determination accuracy is within a similarity range (refer to S711), feature maps of the uppermost re-examination candidate model and the similar re-examination candidate model are extracted (refer to S712). In addition, feature point distribution of the feature maps is extracted (refer to S713).

In this case, as described above, after calculating each difference value of the feature point distribution between the defective training data and the normal training data (refer to S714), an average value is calculated (refer to S715). In addition, by comparing the average value of the uppermost re-examination candidate model with the average value of the similar re-examination candidate model (see S716), when the average value of the uppermost re-examination candidate model is large, the uppermost re-examination candidate model is selected (refer to S717), and when the average value of the similar re-examination candidate model is large, the similar re-examination candidate model is selected (refer to S718), whereby a pre-trained model is determined in step S68.

As above, even in the case where an uppermost candidate model or an uppermost re-examination candidate model exists, when there is a similar candidate model or a similar re-examination candidate model whose determination accuracy is within a similarity range, a final pre-training model is determined by using the feature point distribution of the feature maps so that it is possible to determine the pre-training model for the learning model that is closer to the new learning model.

Meanwhile, as shown in FIG. 2, the pre-training model determination system 100 according to the exemplary embodiment of the present disclosure may further include a label conversion module 160. As described above, the training data includes training images and label information for each training image, and the label conversion module 160 converts the label information of the training data into a pre-registered format. The training data is collected in an actual product production line 300, and the formats of the label information may be different due to a difference in the method of distinguishing and recording defective products and normal products in each product production line 300.

Accordingly, in the present disclosure, the label conversion module 160 converts label information of training data into a pre-registered format such as NG and OK, and the model determination module 130 may determine a pre-training model by using the training data in which the label information is converted by the label conversion module 160.

Hereinafter, the AI-based vision management system according to the exemplary embodiment of the present disclosure will be described in detail with reference to FIGS. 9 and 10.

The AI-based vision inspection management system according to the exemplary embodiment of the present disclosure includes a plurality of vision AI clients 30 and a vision AI cloud 10.

As shown in FIG. 9, the vision AI clients 30 are respectively installed in a plurality of geographically separated product production lines 300, and an AI-based learning model for vision inspection is registered to check whether a defective product exists or not. The product production line 300 may be separated for each product, and the same product production line 300 may be distributed in numerous places. In addition, one product production line 300 may include a plurality of production processes as in the example shown in FIG. 1, and includes an inspection process for vision inspection for parts or products, that is, the results of each production process. Here, it is apparent that the vision AI client 30 may be installed individually in each inspection process, and may be installed in the form of integrally managing each inspection process of one product production line 300.

The vision AI cloud 10 communicates with each vision AI client 30 to manage each vision AI client 30. In addition, the vision AI cloud 10 generates a new learning model to be registered in the vision AI client 30.

FIG. 10 is a view showing an example of a configuration of a vision AI cloud 10 and a vision AI client 30 of the AI-based vision inspection management system according to the exemplary embodiment of the present disclosure.

When described with reference to FIG. 10, the vision AI client 30 may include: a photographing module 31, a client storage 32, a deep learning inspection module 33, a client communication module 34, and a client control module 35.

In order to conduct vision inspection of a result in each process of the product production line 300, the photographing module 31 photographs the result that is the subject of inspection. The deep learning inspection module 33 includes a learned deep learning-based learning model, receives images photographed by the photographing module 31 through the learning model, and determines whether each image is defective or normal.

In the client storage 32, images photographed by the photographing module 31 are stored. Here, in the images stored in the client storage 32, whether normal or defective determined by the deep learning inspection module 33, may be stored together as label information.

The client control module 35 communicates with the vision AI cloud 10 through the client communication module 34. The client control module 35 controls the overall vision inspection through the deep learning inspection module 33, and may update a currently registered learning model or register a new learning model through communication with the vision AI cloud 10.

In addition, when a preset condition is satisfied, the client control module 35 may request re-learning of the learning model currently registered in the vision AI cloud 10. For example, an administrator may check false negatives while checking the defective product images determined by the deep learning inspection module 33. When a false negative ratio is greater than or equal to a predetermined level, the client control module 35 may request re-learning to the vision AI cloud 10. In this case, the client control module 35 may transmit a new image and label information, which are stored in the client storage 32, to the vision AI cloud 10 as new training data.

As shown in FIG. 10, the vision AI cloud 10 may include: a pre-training model determination system 100, a new model generation system 11, a cloud communication module 12, and a cloud control module 13.

The pre-training model determination system 100 determines a pre-training model for generation of a new learning model from among a plurality of learning models stored in the learning-model storage 110 through the above-described process, so the detailed description thereof will be omitted.

The new model generation system 11 generates a new learning model by training the pre-training model determined in the pre-training model determining system 100 by using new training data when the new learning model is to be generated. Here, the new training data is stored in the data storage 140 of the pre-training model determination system 100 as described above.

In addition, in learning of a pre-training model for generation of a new learning model, the new model generation system 11 may perform learning by applying training data, applied to generation of the pre-training model determined by the model determining module 130 when generating the new learning model, that is, the training data used when generating a learning model determined by the pre-training model (e.g., additionally collected training data may be included for re-learning after generation), together with the above-described new training data. In this way, even when the amount of training data collected for the generation of the new learning model is relatively small, the training data of the pre-training model having the features closest to the new learning model is included so that it becomes possible to improve the determination accuracy by learning using a larger amount of training data than before.

Meanwhile, the cloud control module 13 transmits the new learning model generated by the new model generation system 11 to the vision AI client 30 through the cloud communication module 12.

In the present disclosure, a new learning model is generated according to a request of the vision AI client 30 as an example. For example, when the product production line 300 is newly set for production of a new product, it is necessary to generate a new learning model required for the corresponding product production line 300. In this case, an administrator or other vision inspection device determines whether normal or not in the product production line 300 for a predetermined period of time so that defective product images, normal product images, and label information for each new part or product, and defect type may be collected as training data.

In addition, when a predetermined amount of the training data is collected, the client control module 35 of the vision AI client 30 may transmit the collected training data and request the generation of new training data to the vision AI cloud 10, and in this case, the client control module 35 transmits the determination type information as well so that the pre-training model determination system 100 of the vision AI cloud 10 determines the pre-training model. In addition, the cloud control module 13 of the vision AI cloud transmits the new learning model through the cloud communication module 12 so that the new learning model is registered in the vision AI client 30 that has transmitted the request for model generation.

Through the above configuration, when the same new product is produced in the plurality of geographically separated product production lines 300, the collection of initial training data may be distributed, but the training data is intensively transmitted to the vision AI cloud 10, so as to generate a new learning model, whereby it is possible to generate the new learning model to be applied to a corresponding product production line 300 within a short time after the new product production line 300 is set up, Although the exemplary embodiments of the present disclosure have been described above with reference to the accompanying drawings, it will be understood that those skilled in the art to which the present disclosure pertains may implement the present disclosure in other specific forms without departing from the technical spirit or essential features thereof. Therefore, it should be understood that the above-described exemplary embodiments are illustrative in all respects and not restrictive.

DESCRIPTION OF THE REFERENCE NUMERALS IN THE DRAWINGS

10: vision AI Cloud 11: new model generation system
12: cloud communication module 13: cloud control module
14: input part 30: vision AI client
31: photographing module 32: client storage
33: deep learning inspection module 34: client communication module
35: client control module 100: pre-training model determination system
110: learning-model storage 120: candidate model extraction module
130: model determination module 140: data storage
150: main processor 160: label conversion module

INDUSTRIAL APPLICABILITY

The present disclosure is applicable to the field of vision inspection of the result of each production process of a product production line.

The invention claimed is:
1. An AI-based (Artificial Intelligence) pre-training model determination system comprising:
  a learning-model storage configured to store a plurality of learning models for vision inspection on a product production line;
  a data storage configured to store a plurality of training data collected for generation of a new learning model;
  a candidate model extraction module configured to extract at least two or more candidate models from among the plurality of learning models on the basis of determination type information when the determination type information for generating the new learning model is input, and
  a model determination module configured to input a preset number of training data from among the training data stored in the data storage into each of the candidate models to determine whether defective or normal, and determine, as a pre-training model for generating the new learning model, an uppermost candidate model in which determination accuracy of a plurality of candidate models is greater than or equal to a preset first reference value,
  wherein the model determination module extracts feature point distribution of feature maps generated for the training data,
  wherein a difference in the feature point distribution is calculated through a KL-Divergence algorithm,
  wherein the AI-based pre-training model determination system further includes:
  an AI-based vision inspection management system comprising:
  a plurality of vision AI clients respectively installed on a plurality of geographically separated product production lines, and provided with an AI-based learning model for vision inspection registered therein to inspect defects; and
  a vision AI cloud configured to communicate with each of the vision AI clients, manage each of the vision AI clients, and generate a new learning model to be registered in each vision AI client,
  wherein the vision AI cloud comprises:
  a new model generation system configured to use a plurality of training data stored in a data storage of the pre-training model determination system, train a pre-training model determined by a model determination module of the pre-training model determining system, and generate the new learning model.

2. The AI-based pre-training model determination system of claim 1, wherein the model determination module extracts the feature point distribution of the feature maps in a determination process of the uppermost candidate model and a similar candidate model when there is the similar candidate model, among the plurality of candidate models, whose determination accuracy difference from the uppermost candidate model is within a preset similarity range, and determines, as the pre-training model, any one candidate model, among the uppermost candidate model and the similar candidate model, whose difference in the feature point distribution between defective training data and normal training data is large.

3. The AI-based pre-training model determination system of claim 2, wherein the model determination module calculates an average value of the differences in the feature point distribution between a preset number of normal training data and the defective training data, which are arbitrarily selected from among the plurality of training data applied to the determination process of the uppermost candidate model and the similar candidate model, and determines any one candidate model, as the pre-training model, having a large average value among the uppermost candidate model and the similar candidate model.

4. The AI-based pre-training model determination system of claim 1, wherein the model determination module extracts upper-level n pieces of candidate models as re-examination candidate models on the basis of the determination accuracy when the determination accuracy of the plurality of candidate models is less than or equal to the first reference value, trains each of the re-examination candidate models with the preset number of training data among the plurality of training data, inputs the preset number of training data among the plurality of training data into the trained re-examination candidate models to determine whether defective or normal, and determines, as the pre-training model, an uppermost re-examination candidate model in which the determination accuracy of each re-examination candidate model is greater than or equal to a preset second reference value.

5. The AI-based pre-training model determination system of claim 4, wherein, when extracting the re-examination candidate models, the model determination module removes candidate models, whose determination accuracy is less than or equal to a preset lower limit, from the re-examination candidate models.

6. The AI-based pre-training model determination system of claim 4, wherein the model determination module extracts feature point distribution of feature maps generated for each of the training data in a determination process of the uppermost re-examination candidate model and a similar re-examination candidate model when there is the similar re-examination candidate model, among the plurality of re-examination candidate models, whose determination accuracy difference from the uppermost re-examination candidate model is within a preset similarity range, and determines, as the pre-training model, any one candidate model, whose feature point distribution difference between defective training data and normal training data is large, among the uppermost re-examination candidate model and the similar re-examination candidate model.

7. The AI-based pre-training model determination system of claim 6, wherein the model determination module calculates an average value of the feature point distribution differences between a preset number of normal training data and defective training data, which are arbitrarily selected from among the plurality of training data applied to the determination process of the uppermost re-examination candidate model and the similar re-examination candidate model, and determines one candidate model, as the pre-training model, whose average value is large from the uppermost re-examination candidate model and the similar re-examination candidate model.

8. The AI-based pre-training model determination system of claim 6, wherein the difference in the feature point is calculated through a KL-Divergence algorithm.

9. The AI-based pre-training model determination system of claim 1, wherein the determination type information comprises at least one of defect type information on a type of defects, product type information on a type of products to be inspected, and part type information on a type of parts to be inspected,
    each of the learning models stored in the learning-model storage comprises model information having at least one of the defect type information, the product type information, and the part type information, and
    the candidate model extraction module extracts the candidate model with reference to the model information.

10. The AI-based pre-training model determination system of claim 9, wherein the candidate model extraction module extracts a preset number of learning models as the candidate models according to a priority set in an order of the defect type information, the part type information, and the product type information.

11. The AI-based pre-training model determination system of claim 1, wherein the training data comprises a training image and label information in which information on defect or normal for the training image is recorded, and further comprises a label conversion module configured to convert the label information of the training data into a pre-registered format, and
    the model determination module determines the pre-training model by using the training data in which the label information is converted by the label conversion module.

12. The AI-based vision inspection management system of claim 1, wherein the vision AI cloud further comprises a cloud control module configured to register the new learning model generated by the new model generation system to at least one of the plurality of vision AI clients.

13. The AI-based vision inspection management system of claim 12, wherein the plurality of training data stored in the data storage is stored after being transmitted from at least one of the plurality of vision AI clients,
    the pre-training model determination system determines the pre-training model according to a model generation request from the vision AI cloud that has transmitted the training data, and
    the cloud control module registers the new learning model in the vision AI cloud that has transmitted the model generation request.

14. The AI-based vision inspection management system of claim 12, wherein the new model generation system applies the training data applied to generation of the pre-training model determined by the model determination module to learning of the pre-training model for generation of the new learning model.

15. An AI-based (Artificial Intelligence) pre-training model determination system comprising:
    a learning-model storage configured to store a plurality of learning models for vision inspection on a product production line;
    a data storage configured to store a plurality of training data collected for generation of a new learning model;
    a candidate model extraction module configured to extract at least two or more candidate models from among the plurality of learning models on the basis of determination type information when the determination type information for generating the new learning model is input, and a model determination module configured to input a preset number of training data from among the training data stored in the data storage into each of the candidate models to determine whether defective or normal, and determine, as a pre-training model for generating the new learning model, an uppermost candidate model in which determination accuracy of a plurality of candidate models is greater than or equal to a preset first reference value, wherein the model determination module extracts feature point distribution of feature maps generated for the training data, wherein a difference in the feature point distribution is calculated through a KL-Divergence algorithm, wherein the AI-based pre-training model determination system further includes:

an AI-based vision inspection management system comprising:

a plurality of vision AI clients respectively installed on a plurality of geographically separated product production lines, and provided with an AI-based learning model for vision inspection registered therein to inspect defects; and a vision AI cloud configured to communicate with each of the vision AI clients, manage each of the vision AI clients, and generate a new learning model to be registered in each vision AI client, wherein the vision AI cloud comprises:

a new model generation system configured to use a plurality of training data stored in a data storage of the pre-training model determination system, train a pre-training model determined by a model determination module of the pre-training model determining system, and generate the new learning model.

16. An AI-based (Artificial Intelligence) pre-training model determination system comprising:

a learning-model storage configured to store a plurality of learning models for vision inspection on a product production line;

a data storage configured to store a plurality of training data collected for generation of a new learning model;

a candidate model extraction module configured to extract at least two or more candidate models from among the plurality of learning models on the basis of determination type information when the determination type information for generating the new learning model is input, and a model determination module configured to input a preset number of training data from among the training data stored in the data storage into each of the candidate models to determine whether defective or normal, and determine, as a pre-training model for generating the new learning model, an uppermost candidate model in which determination accuracy of a plurality of candidate models is greater than or equal to a preset first reference value, wherein the model determination module extracts feature point distribution of feature maps generated for the training data, wherein a difference in the feature point distribution is calculated through a KL-Divergence algorithm, wherein the AI-based pre-training model determination system further includes:

an AI-based vision inspection management system comprising:

a plurality of vision AI clients respectively installed on a plurality of geographically separated product production lines, and provided with an AI-based learning model for vision inspection registered therein to inspect defects; and a vision AI cloud configured to communicate with each of the vision AI clients, manage each of the vision AI clients, and generate a new learning model to be registered in each vision AI client, wherein the vision AI cloud comprises:

a new model generation system configured to use a plurality of training data stored in a data storage of the pre-training model determination system, train a pre-training model determined by a model determination module of the pre-training model determining system, and generate the new learning model.

* * * * *